T. J. WEAVER.
AUTO TOWING DEVICE.
APPLICATION FILED MAY 25, 1920.
1,381,042.
Patented June 7, 1921.
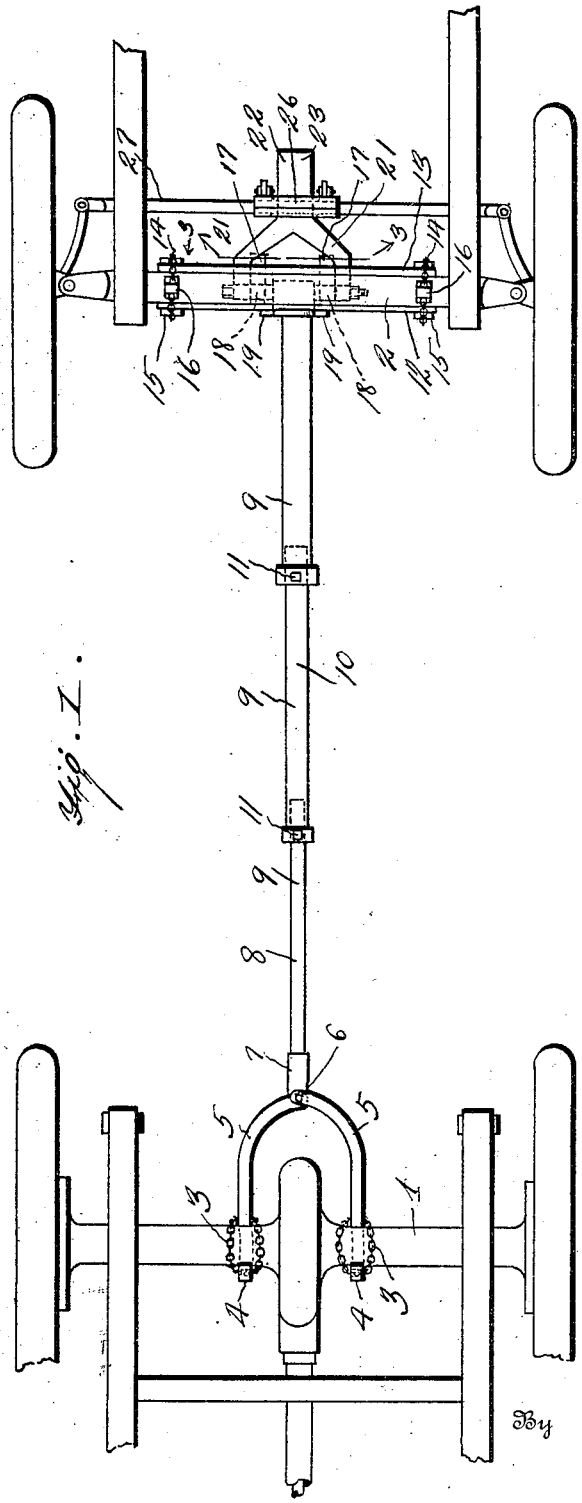
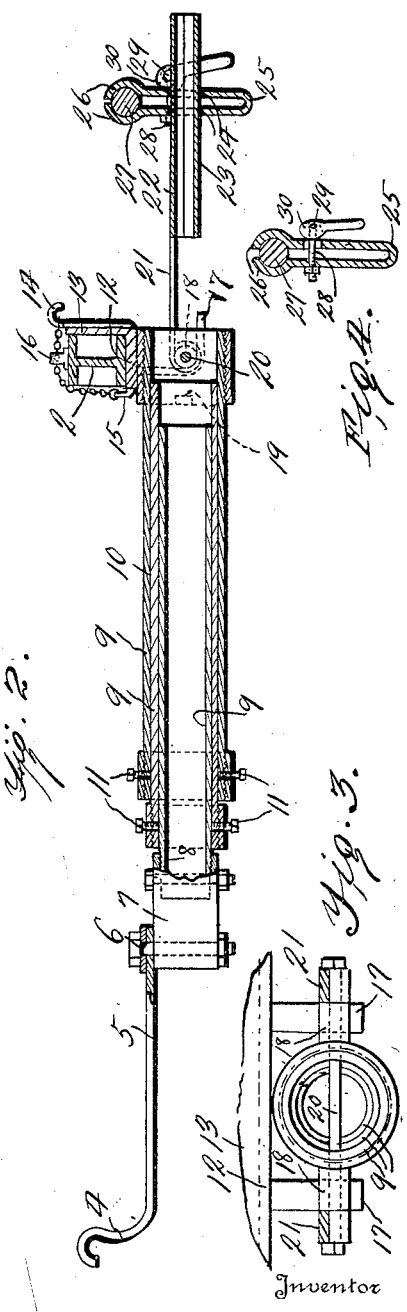
Inventor
THOMAS J. WEAVER,
By
his Attorney

UNITED STATES PATENT OFFICE.

THOMAS J. WEAVER, OF DENVER, COLORADO.

AUTO-TOWING DEVICE.

1,381,042.  Specification of Letters Patent.  Patented June 7, 1921.

Application filed May 25, 1920. Serial No. 384,050.

*To all whom it may concern:*

Be it known that I, THOMAS J. WEAVER, a citizen of the United States, residing at Denver, in the county of Denver, State of Colorado, have invented a new and useful Auto-Towing Device; and I do hereby declare the following to be a full, clear, and exact description of the invention, such as will enable others skilled in the art to which it appertains to make and use the same.

The invention relates to auto towing devices and has for its object to provide a device of this character comprising a beam formed from a series of telescopically engaged members so that the vehicle that is being towed may be towed at various distances from the front or towing vehicle. Also to provide means adapted to be secured to the front axle of the towed vehicle whereby the telescopical beam will be supported in lugs, which lugs engage lugs carried by the beam and form means for allowing side rocking in a horizontal plane of the towing beam so that a member pivoted to the lugs of the beam will be caused to move from side to side so as to move the connecting rod between the wheel spindle arms thereby causing the towed vehicle to be steered according to the direction of turn of the towing vehicle.

A further object is to provide a U-shaped clamping member adapted to be clamped to the connecting rod of the disabled vehicle and through which clamp the pivoted beam carrying arm extends so that said connecting rod may be moved from side to side. Also to provide cam levers for clamping the U-shaped clamp on the connecting rod.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a plan view of the towing device showing the same applied to two vehicles and in position for use.

Fig. 2 is a longitudinal sectional view through the device showing the beam in shortened condition.

Fig. 3 is a detail sectional view taken on line 3—3 of Fig. 1.

Fig. 4 is a detail sectional view through the U-shaped clamping member.

Referring to the drawings, the numeral 1 designates the rear axle of a towing vehicle and 2 the front axle of a disabled vehicle which is to be towed to a garage or the like. The axle 1 has secured thereto by means of chains or the like 3 the hooked arms 4 of links 5, which links extend rearwardly and curve toward each other and are pivoted at a common pivotal point 6 which is a bolt extending through the sleeve 7 threaded on the end of a tubular member 8, which tubular member forms one of the telescopical sections 9 of the towing beam 10, there being set screws 11 for holding the telescopical engaging members in any position to which they may have been moved for adjusting the distance between the vehicles during a towing operation.

Disposed under the axle 2 is an angle plate 12 the flange 13 of which engages the rear face of the axle and is provided with a hook 14. A chain or other securing means extends from the hook 14 to an apertured lug 15 carried by the forward end of the flange of the angle plate which engages the under face of the axle 2. There being lugs 14 and 15 at each end of the angle plate 12, so that said plate may be secured to the axle 2 and held in place thereon. The chains are preferably passed through blocks 16, which prevent the chain from marring the finish on the axle and if so desired they may be faced with leather or rubber. The angle plate 12 is provided with downwardly and rearwardly extending arms 17 on the horizontal portions of which the cylindrical lugs 18 which are carried by the rear telescopical member 9 engage and are adapted to slide rearwardly thereon during a steering operation, the rearward movement of the sleeve 18 being limited by lugs 19 carried by the sleeves and so positioned that they will come into engagement with the vertical portions of the arms 17 on extreme turns thereby preventing the disengagement of the lugs 18 with the horizontal portions of the arms 17. Extending transversely through the rear end of the rear section 9 and through the sleeves 18 is a bolt 20, to the ends of which bolt are pivoted the arms 21 of the rearwardly extending member 22. Member 22 is provided with an arm 23, which arm extends through registering apertures 24 of a U-shaped clamp 25. Clamp 25 is made from spring material and is provided with concaved grooves 26 for the reception of the connecting rod 27 of the steering mechanism when the clamp is placed in position thereon. The arms of the clamps 25 are sprung together and held in clamping position on the connecting rod 27 by means of bolts 28 which pass through the arms of the clamp and have pivoted as at 29 to one end thereof cam levers 30, which cam levers are adapted to be moved to the position shown in Fig. 4 for clamping the clamp in position on the connecting rod. The apertures 24 are of sufficient size so as to allow side movement of the arm 23, that is sufficiently large to prevent binding of the same during steering operations.

As the front vehicle turns to the right or left the sleeve 18 will slide on the horizontal portions of the arms 17 according to the direction of turns, thereby causing the connecting rod 27 to be moved longitudinally according to the direction of turn of the vehicle. It will also be seen that the towing beam may be shortened or lengthened as desired so that the vehicle may be towed short or at a distance. By providing a beam formed from telescopical sections it will also be seen that the towing device as a whole may be collapsed and stored in a small compass which is essential where a towing beam is carried from place to place around the city.

The invention having been set forth, what is claimed as new and useful is:—

1. A towing device for automobiles comprising a beam formed from telescopically engaging members, means for adjusting said members in relation to each other, one of said sections being provided with a yoke adapted to be secured to the rear axle of an automobile, a channel iron secured to the axle of the towed automobile, downwardly and rearwardly extending arms carried by the under face of the channel iron, lugs carried by the rear section of the beam and resting on the horizontal portions of the downwardly and rearwardly extending arms and adapted to slide thereon according to the direction of turn of the towing vehicle, a yoke having its arms pivoted to the outer ends of the lugs, said yoke being provided with a rearwardly extending arm, and a clamp connected to the connecting rod of the steering mechanism and provided with an aperture for the reception of the rearwardly extending arm of the yoke.

2. A towing device for automobiles comprising a beam formed from telescopically engaging members, means for adjusting said members in relation to each other, one of said sections being provided with a yoke adapted to be secured to the rear axle of a towing automobile, an angle iron secured to the under face of the towed automobile, downwardly and rearwardly extending arms carried by the angle iron, lugs carried by the rear section of the beam and disposed on the rearwardly extending portions of the downwardly and rearwardly extending arms and adapted to slide thereon according to the direction of turn, lugs carried by the rear section of the beam and spaced from the downwardly and rearwardly extending arms for limiting the rearward movement of the rear section of the beam and maintaining the lugs thereof on the rearwardly extending portions of the arms, a rearwardly extending arm pivoted to the rear section of the beam and having its rear end disposed in an aperture of a clamp carried by the connecting rod of the steering mechanism.

In testimony whereof I have signed my name to this specification in the presence of two subscribing witnesses.

THOMAS J. WEAVER.

Witnesses:
P. O'BYRNE,
MICHAEL SMITH.